United States Patent Office 3,179,651
Patented Apr. 20, 1965

3,179,651
CYANOTHIOGLYOXAMIDES AND CYANOTHIOL-GLYOXYLIMIDATES OF AROMATIC HYDRAZONES
Francis W. Stacey, Wilmington, Del., assignor to E. I. du Pont de Nemours and Company, Wilmington, Del., a corporation of Delaware
No Drawing. Filed Apr. 29, 1963, Ser. No. 276,207
16 Claims. (Cl. 260—192)

This invention relates to a new class of hydrazones. More particularly, the present invention relates to cyanothioglyoxamides and cyanothiolglyoxylimidates of aromatic hydrazones.

The compounds of this invention have the formulas (I) 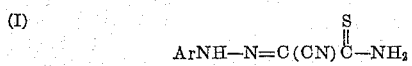

and (II) ArNH—N=C(CN)C(SR)=NH wherein Ar is a carbocyclic aromatic radical and R is hydrogen or a lower alkyl radical, i.e., an alkyl radical of 1–4 carbon atoms. Preferably Ar contains 6–12 carbon atoms in toto and represents a phenyl, naphthyl, or substituted phenyl group. The preferred substituents on said substituted phenyl are halogen such as fluorine, chlorine, bromine, alkyl such as methyl, alkyl substituted amino such as dimethylamino, carbacylamino (i.e.,

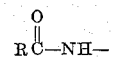

wherein R is hydrocarbon) such as acetylamino, carbacyl (i.e. RCO— wherein R is hydrocarbon) such as acetyl, alkoxy such as methoxy, carboalkoxy such as carbomethoxy, phenylthio, phenoxy, halophenylthio such as chlorophenylthio and halophenoxy such as chlorophenoxy (preferably monohalo- and dihalo-), pentafluorosulfido ($F_5S$—), and the radical ($YC_nF_{2n}X$—) wherein X is sulfur or oxygen, Y represents hydrogen or fluorine, and $n$ is an integer of 1–4 inclusive. Preferably, Ar contains two or fewer substituents, but the number can be greater. Preferably again, they are alike, but they can be different. Generally, the total carbon content in Ar does not exceed nine atoms.

Although the new compounds have been represented by the above Formulas I and II, i.e., in the phenylhydrazone form, they can also be represented as having the tautomeric azo forms (III) 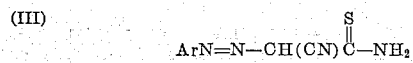

and (IV) ArN=N—CH(CN)C(SR)=NH

In confirmation of the tautomeric structures, when malononitrile is reacted with a diazonium salt, aromatic hydrazones of carbonyl cyanide [ArNHN=C(CN)$_2$] are obtained which are generally written as the aromatic azomalononitrile [ArN=N—CH(CN)$_2$]. In view of solubilities of the products in mild alkaline media, the compounds of this invention appear to exist primarily in the hydrazone form.

The compounds of this invention are obtained by reaction of hydrogen sulfide or a lower alkyl thiol (RSH) with an aromatic hydrazone of carbonyl cyanide, i.e., ArNHN=C(CN)$_2$ The reaction is conducted in a liquid medium and inert solvents, such as aromatic hydrocarbons, are generally employed. Other inert solvents such as tetrahydrofuran or dioxane can be used either alone or with hydrocarbons. The preferred solvents have physical properties that permit facile isolation of the desired product.

For best results a soluble basic catalyst is employed such as tertiary amines. These include hydrocarbyl amines, e.g., trimethylamine, tripropylamine, and N-methylpiperidine and oxy- and hydroxy-containing tertiary amines, e.g., triethanolamine and N-methylmorpholine.

The reaction makes no special requirement on conditions. Suitable temperatures are between 0° and 100° C. with 20–50° C. being generally satisfactory. Times of a few minutes to several hours are generally employed. Pressures of greater than atmospheric are not necessary unless it is desired to conserve the amount of volatile thiol or hydrogen sulfide employed.

Thiol, as used throughout this application, is equivalent to "mercaptan" and represents the preferred nomenclature indicated in C.A. 56, Subject Index (A–H), 65N, Entry 443 (1962).

The aromatic azomalononitriles (or tautomeric aromatic hydrazones of carbonyl cyanide), used as starting materials in this invention, are obtainable by the method described by Schmidtmann, Ber., 29, 1174, as well as by Todd et al., J. Chem. Soc., 1944, 315. For convenience, these are often named according to the literature on the aromatic azomalononitrile basis (A), although they probably exist in major part as the tautomeric aromatic hydrazone of carbonyl cyanide (B), i.e., ArN=N—CH(CN)$_2$(A) ⇌ ArNH—N=C(CN)$_2$ (B)

The following detailed description further illustrates the preparation of the new compounds of this invention.

EXAMPLE I

Phenylhydrazone of cyanothioglyoxamide

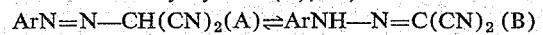

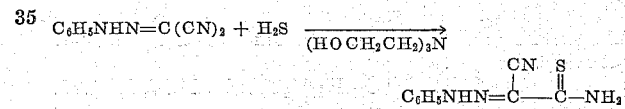

A solution of 10 g. of phenylhydrazone of carbonyl cyanide in about 1200 ml. of dry benzene with 3 ml. of triethanolamine was warmed to 45° C. Hydrogen sulfide was bubbled in during two hours while the mixture was stirred. No external heat was applied during this period and the reaction temperature dropped from 45° C. to 30° C. Stirring was continued for an hour after discontinuing hydrogen sulfide addition. The yellow precipitate of the phenylhydrazone of cyanothioglyoxamide was filtered off and air dried. It weighed 10.5 g. (88% yield). Recrystallization from absolute alcohol gave 6.5 g. of material melting at 211–213° C., with decomposition.

Analysis.—Calcd. for $C_9H_8N_4S$: N, 27.44; S, 15.67. Found: N, 26.46, 26.77; S, 15.34.

The IR spectrum showed NH absorptions at 2.95μ, 3.10μ and 3.20μ and a rather weak C≡N absorption at 4.55μ.

EXAMPLE II m-Chlorophenylhydrazone of cyanothioglyoxamide

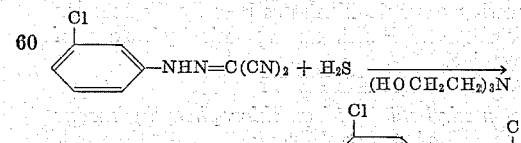

Hydrogen sulfide was bubbled into a solution of 15 g. of carbonyl cyanide m-chlorophenylhydrazone in 1400 ml. of benzene, 100 ml. of tetrahydrofuran and 6 ml. of triethanolamine for three hours at a temperature of 30–35° C. The yellow-orange precipitate of the thioamide was filtered off and air dried to yield 14 g. (80% yield).

After recrystallization from absolute alcohol, it melted at 224–226° C. (dec.).

Analysis.—Calcd. for C₉H₇N₄SCl: S, 13.44; N, 23.48. Found: S, 13.24; N, 23.45.

EXAMPLE III

*p-(4-chlorophenylthio)phenylhydrazone of cyanothioglyoxamide*

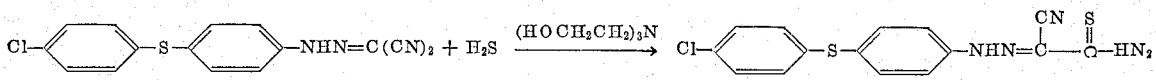

Sixteen grams of p-(4-chlorophenylthio)phenylhydrazone of carbonyl cyanide was dissolved in a mixture of 1400 ml. of benzene, 100 ml. of tetrahydrofuran, and 4 g. of triethanolamine at 40° C. Hydrogen sulfide was bubbled through the mixture for three hours, during which time the temperature dropped from 40° C. to 30° C. The precipitated yellow solid was filtered off and air dried to yield 17.2 g. (97% yield). After recrystallization from absolute alcohol, in which the product is only sparingly soluble, it melted at 212–214° C. (dec.).

EXAMPLE IV

*p-Carbomethoxyphenylhydrazone of cyanothioglyoxamide*

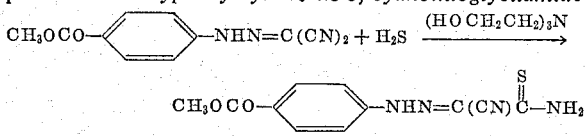

A solution of 6 g. of the p-carbomethoxyphenylhydrazone of carbonyl cyanide in 250 ml. of benzene and 100 ml. of tetrahydrofuran was stirred with 2 ml. of triethanolamine. A stream of hydrogen sulfide was bubbled into the stirred mixture during 2¼ hours. The mixture was then filtered to obtain 4.5 g. of orange solid which had precipitated in the course of the reaction. This product did not melt but decomposed at temperatures above 245° C. Its infrared spectrum showed NH absorptions at 2.95μ and at 3.05–3.15μ, C≡N at 4.5μ and C=O at 5.87μ.

Analysis.—Calcd. for C₁₁H₁₀N₄O₂S: N, 21.37; S, 12.20. Found: N, 21.22; S, 11.64.

EXAMPLE V

*p-Dimethylaminophenylhydrazone of cyanothioglyoxamide*

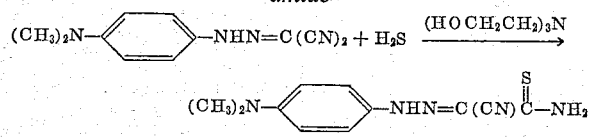

A solution of 9 g. of p-dimethylaminophenylhydrazone of carbonyl cyanide in 300 ml. of benzene and 200 ml. of tetrahydrofuran was stirred with 2 ml. of triethanolamine. A slow stream of hydrogen sulfide was bubbled through the mixture during 3½ hours. The mixture was cooled in ice, and the black, finely divided precipitate was filtered off and air dried. The solid weighed 8.5 g. (82% yield) and melted at 176.5–177.5° C.

Analysis.—Calcd. for C₁₁H₁₃N₅S: N, 28.33; S, 12.94. Found: N, 28.02; S, 12.50.

The following example illustrates broadly the reaction of a lower alkyl thiol with an aromatic hydrazone of carbonyl cyanide.

EXAMPLE VI

*Reaction of methyl thiol with m-chlorophenylhydrazone of carbonyl cyanide*

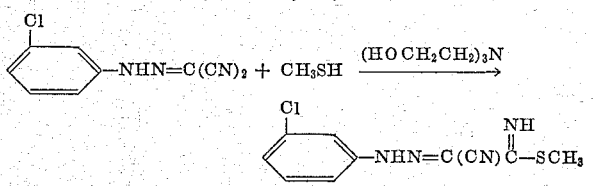

A solution of 5 g. of m-chlorophenylhydrazone of carbonyl cyanide in 600 ml. of dry benzene was stirred with 2 ml. of triethanolamine at 40° C. Methyl thiol was bubbled through the solution for three hours. The temperature remained at about 30° C. during the course of the reaction. A small amount of solid which separated during the reaction was filtered off after cooling the mixture. It weighed 0.7 g. and melted at 141–143° C. Partial evaporation of the filtrate gave about 2 g. of yellow solid melting at 156–157.5° C. Recrystallization from absolute alcohol raised the melting point to 168–169° C. The infrared spectrum and analysis showed that this material was the 1:1 adduct of methyl thiol and m-chlorophenylhydrazone of carbonyl cyanide. For example, the IR spectrum showed three bands in the NH region at 2.8, 2.9, and 3.0μ compared to the single band at 3.0μ shown by the starting material.

Additional compounds that can be reacted with hydrogen sulfide or a lower alkyl thiol include: p-tolylazomalononitrile, β - naphthylazomalononitrile, p - acetylphenylazomalononitrile, p - acetamidophenylazomalononitrile, p - methoxyphenylazomalononitrile, m - fluorophenylazomalononitrile, and 2,5-dibromophenylazomalononitrile. When these are reacted with hydrogen sulfide in the presence of a basic catalyst as described in the preceding examples, there are obtained the corresponding aromatic hydrazones of cyanothioglyoxamide (C), or corresponding tautomer forms of Formulas D, E, and F, i.e.:

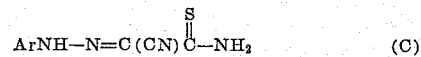 (C)

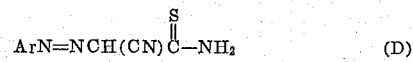 (D)

ArNHN=C(CN)C(SH)=NH      (E)

ArN=NCH(CN)C(SH)=NH      (F)

Compounds thus provided include p-tolylhydrazone of cyanothioglyoxamide, β-naphthylhydrazone of cyanothioglyoxamide, p-acetylphenylhydrazone of cyanothioglyoxamide, p-acetamidophenylhydrazone of cyanothioglyoxamide, p-methoxyphenylhydrazone of cyanothioglyoxamide, m-fluorophenylhydrazone of cyanothioglyoxamide, and 2,5-dibromophenylhydrazone of cyanothioglyoxamide.

In place of hydrogen sulfide, lower alkyl thiols can also be used. For example, if butyl thiol is used in place of hydrogen sulfide for the above compounds, the corresponding lower alkyl imino sulfides of the following tautomeric Formulas G and H are obtained:

ArNH—N=C(CN)C—(SR)=NH      (G)

ArN=N—CH(CN)C(SR)=NH      (H)

where R is lower alkyl and specifically butyl. Thus, when the aromatic (Ar) group is p-tolyl, the compound produced is the p-tolylhydrazone of cyanobutylthioglyoxylimidate (G) or the corresponding tautomer (S—)butyl-2-cyano-2-phenylazothioacetimidate.

Compounds that have other substituents on the aromatic nucleus such as a pentafluorosulfido group (F₅S—) can also be obtained by the process described. For example, the m-, p-, and 3,5-di-pentafluorosulfidophenylhydrazone of cyanothioglyoxamide are prepared by reaction of hydrogen sulfide on the corresponding carbonyl cyanides. Reaction with a lower alkyl thiol, such as propyl thiol, gives the corresponding m-, p-, and 3,5-dipentafluorosulfidophenylhydrazones of cyanopropylthioglyoxylimidate or the corresponding tautomers. For the preparation of these compounds, the bis(m-, p-, or 3,5-dinitrophenyl) disulfide is reacted with silver difluoride to obtain the corresponding nitrophenylsulfur pentafluorides which on reduction to the amines and formation of the diazonium salt are reacted with malononitrile as shown in U.S. Patent 3,144,478.

A further class of aromatic hydrazones of carbonyl cyanide that can be converted to the corresponding cyanothioglyoxamides or cyanoalkylthioglyoxylimidates or their corresponding tautomers [see Formulas C through H] are those carbonyl cyanides of arylhydrazones having polyhaloalkyl groups attached through oxygen or sulfur to the aromatic ring. Such new compounds have the formula

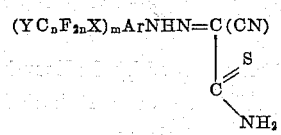

[corresponding to (C) above], wherein Y is H or F, $n$ is an integer, generally 1–4, $m$ is an integer of at least one and preferably not over three, X is S or O and Ar is an aryl, generally of 6–12 carbons. Included are p-trifluoromethoxyphenylhydrazone of cyanothioglyoxamide, p-pentafluoroethoxyphenylhydrazone of cyanothioglyoxamide, and m-(1,1,2,2-tetrafluoroethylthio)phenylhydrazone of cyanothioglyoxamide and the corresponding cyanoalkylthioglyoxylimidates formed by reaction of a lower alkyl thiol such as ethyl thiol in place of hydrogen sulfide. The latter gives the p-trifluoromethoxyphenylhydrazone of cyanoethylthioglyoxylimidate, p-pentafluoroethoxyphenylhydrazone of cyanoethylthioglyoxylimidate, and m-(1,1,2,2 - tetrafluoroethylthio)phenylhydrazone of cyanoethylthioglyoxylimidate. The starting materials for these reactions are obtained from malononitrile and the diazonium salts of polyhaloalkoxy- or polyhaloalkylthioaryl amines as disclosed in the application by Sheppard, Ser. No. 194,671, filed May 14, 1962.

Additional aromatic hydrazones of carbonyl cyanide that can be reacted with hydrogen sulfide or a lower alkyl thiol include those having an arylthio or aryloxy substituent on the aromatic nucleus. The aryl groups may be substituted or unsubstituted, the preferred substituents being halogen of atomic number 9–35 inclusive and the preferred aryl group being phenyl. These hydrazones include p-(4-chlorophenylthio)phenylhydrazone of carbonyl cyanide and p-phenoxyphenylhydrazone of carbonyl cyainide. Upon reaction with hydrogen sulfide or an alkyl thiol such as methyl thiol, compounds obtained include the p-(4-chlorophenylthio)phenylhydrazone of cyanothioglyoxamide, p-phenoxyphenylhydrazone of cyanothioglyoxamide, p-phenoxyphenylhydrazone of cyanomethylthioglyoxylimidate, and p-(4 - chlorophenylthio)-phenylhydrazone of cyanomethylthioglyoxylimidate and tautomers of the above. The starting hydrazones are prepared by reaction of malononitrile with a diazonium salt of the aromatic thio- or oxy-substituted aromatic amine as shown in the application by Prichard, Ser. No. 204,-050, filed June 21, 1962.

The new compounds of this invention are generally high melting solids that are soluble in alcohol.

The new compounds of this invention are active when employed against early and late blights of tomato and apple scab. For example, when applied in water at a concentration of about 0.2% to tomato foliage, the compounds are effective against the tomato early blight. When applied to apple foliage at a concentration of about 0.1%, the foliage was protected against apple scab fungus.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound selected from the group consisting of (I) tautomeric thiocarbamoyls having the formula and (II) tautomeric mercaptoimines having the formula

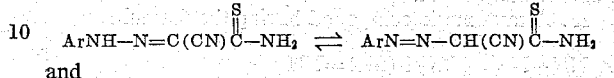
and
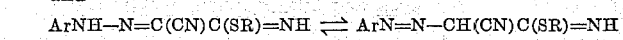

wherein R is selected from the class consisting of hydrogen and a $C_1$–$C_4$ alkyl and Ar is selected from the class consisting of phenyl, naphthyl, and substituted phenyl wherein the substituent thereon is selected from the class consisting of fluorine, chlorine, bromine, methyl, dimethylamino, acetylamino, acetyl, methoxy, $CH_3OCO$—, phenylthio, phenoxy, chlorophenylthio, chlorophenoxy, the pentafluorosulfido radical $F_5S$—, and the radical $YC_nF_{2n}X$— wherein X is selected from the class consisting of oxygen and sulfur, Y is selected from the class consisting of hydrogen and fluorine, and $n$ is an integer of 1 to 4 inclusive.

2. A tautomeric compound having the formula

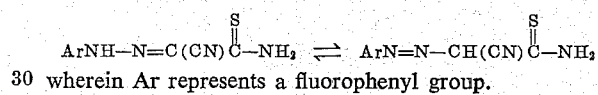

wherein Ar represents a fluorophenyl group.

3. A tautomeric compound having the formula

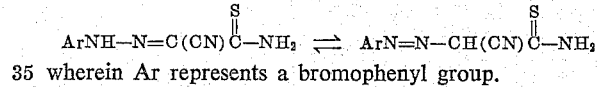

wherein Ar represents a bromophenyl group.

4. A tautomeric compound having the formula

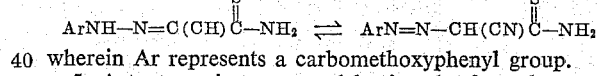

wherein Ar represents a carbomethoxyphenyl group.

5. A tautomeric compound having the formula

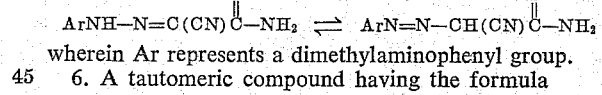

wherein Ar represents a dimethylaminophenyl group.

6. A tautomeric compound having the formula

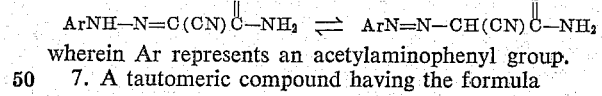

wherein Ar represents an acetylaminophenyl group.

7. A tautomeric compound having the formula

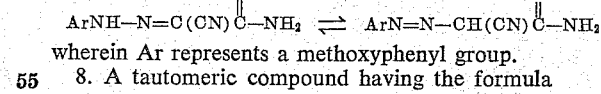

wherein Ar represents a methoxyphenyl group.

8. A tautomeric compound having the formula

ArNH—N=C(CN)C(SH)=NH
⇌ArN=N—CH(CN)C(SH)=NH wherein Ar represents an acetylphenyl group.

9. A tautomeric compound having the formula

ArNH—N=C(CN)C(SH)=NH
⇌ArN=N—CH(CN)C(SH)=NH wherein Ar represents substituted phenyl wherein the substituent thereon is the radical $YC_nF_{2n}X$— wherein X is oxygen, Y is fluorine and $n$ is an integer of 1 to 4 inclusive.

10. A tautomeric compound having the formula

ArNH—N=C(CN)C(SR)=NH
⇌ArN=N—CH(CN)C(SR)=NH wherein R is a $C_1$–$C_4$ alkyl radical and Ar represents tolyl.

11. A tautomeric compound having the formula

ArNH—N=C(CN)C(SR)=NH
⇌ArN=N—CH(CN)C(SR)=NH wherein R is a $C_1$–$C_4$ alkyl radical and Ar represents a methoxyphenyl group.

12. A tautomeric compound having the formula $$ArNH-N=C(CN)C(SR)=NH$$
$$\rightleftharpoons ArN=N-CH(CN)C(SR)=NH$$

wherein R is a $C_1$–$C_4$ alkyl radical and Ar represents substituted phenyl wherein the substituent thereon is a pentafluorosulfido radical.

13. A tautomeric compound having the formula $$ArNH-N=C(CN)C(SR)=NH$$
$$\rightleftharpoons ArN=N-CH(CN)C(SR)=NH$$

wherein R is a $C_1$–$C_4$ alkyl radical and Ar represents substituted phenyl wherein the substituent thereon is a radical $YC_nF_{2n}X-$ wherein X is sulfur, Y is hydrogen and n is an integer of 1 to 4 inclusive.

14. The tautomeric compound having the formula

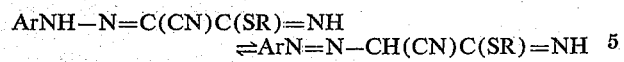

15. The tautomeric compound having the formula

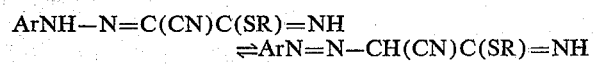

16. The tautomeric compound having the formula

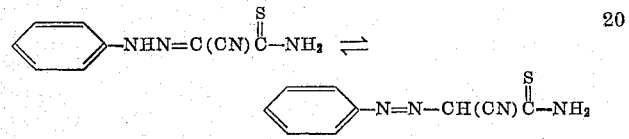

References Cited by the Examiner
UNITED STATES PATENTS
2,779,780    1/57    Middleton _____ 260—465

CHARLES B. PARKER, *Primary Examiner.*